(12) United States Patent
Ghiglino et al.

(10) Patent No.: US 7,003,300 B2
(45) Date of Patent: Feb. 21, 2006

(54) METHOD FOR ROUTING IN TELECOMMUNICATIONS NETWORKS

(75) Inventors: Barbara Ghiglino, Genoa (IT); Marcello Orizi, Alghero (IT)

(73) Assignee: Marconi Communications S.p.A., Genoa (IT)

( * ) Notice: Subject to any disclaimer, the term of this patent is extended or adjusted under 35 U.S.C. 154(b) by 0 days.

(21) Appl. No.: 10/483,691

(22) PCT Filed: Jul. 9, 2002

(86) PCT No.: PCT/IB02/03365

§ 371 (c)(1),
(2), (4) Date: Jul. 26, 2004

(87) PCT Pub. No.: WO03/007557

PCT Pub. Date: Jan. 23, 2003

(65) Prior Publication Data

US 2004/0248576 A1 Dec. 9, 2004

(30) Foreign Application Priority Data

Jul. 13, 2001 (IT) .......................... MI2001A1508

(51) Int. Cl.
*H04Q 7/20* (2006.01)
(52) U.S. Cl. ..................................... 455/445; 455/446
(58) Field of Classification Search ................ 455/445, 455/446, 436, 422.1
See application file for complete search history.

(56) References Cited

U.S. PATENT DOCUMENTS 6,141,552 A * 10/2000 Sendonaris et al. ......... 455/436
6,151,327 A * 11/2000 Sofman et al. ............. 370/437
6,437,804 B1 * 8/2002 Ibe et al. .................... 715/736

OTHER PUBLICATIONS

*Distributed Hierarchical Optimal Routing Using Aggregation/Disaggregation and Decomposition/Composition Techniques*, Sung-Woo Park, et al., Parallel Processing Symposium, 1991 Proceedings., Fifth International Anaheim, CA, Apr. 2-May, 1991, Los Alamitos, CA, IEEE Comput. Soc., US, Apr. 30, 1991, pp. 424-431.

*A Distributed Routing And Access Control Scheme for ATM Networks*, R. Bolla, et al., Communications, 1994, ICC '94 Supercomm/ICC '94, Conference Record, 'Serving Humanity Through Communications'. IEEE International Conference on New Orleans, LA, USA May 1-5, 1994, New York, NY, USA, IEEE, May 1, 1994, pp. 44-50.

*Distributed Routing Using Topology Database in Large Computer Networks*, K. J. Lee, et al., Networks: Evolution or Revolution? New Orleans, Mar. 27-31, 1988, Proceedings of the Annual Joint Conference of the Computer and Communications Societies. (Infocom), New York, IEEE, US., vol. Conf. 7, Mar. 27, 1988, pp. 593-602.

(Continued)

*Primary Examiner*—Erika A. Gary
(74) *Attorney, Agent, or Firm*—Kirschstein, et al.

(57) ABSTRACT

To perform routing in telecommunications networks it is proposed to partition the network, create a reduced graph on the partitions in a preprocessing step in which a dual graph of the network is constructed and the graph is reduced using connections determined by the characteristics of the apparatuses. The routing is then performed on the converted graph. Graph updating techniques to keep it coherent are also described. Each time a routing is requested for a type of traffic not yet considered, a reduced graph for that traffic is constructed while canceling the arch of the original graph which does not support that traffic. For each type of traffic only the reduced graph developed by graph partitioning as described above is kept in memory with considerable resource savings.

12 Claims, 10 Drawing Sheets

OTHER PUBLICATIONS

Figure 1:
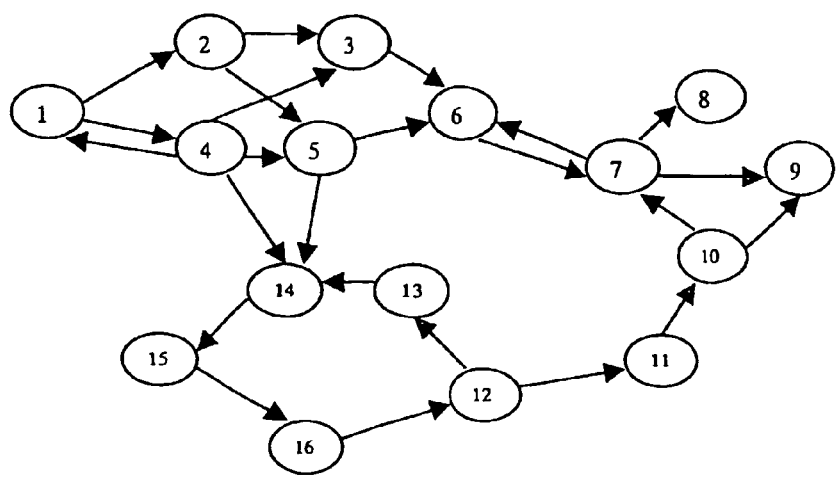

*Submarine: An Architecture For IP Routing Over Large NBMA Networks*, A. G. Lauck, et al., Infocom '99, Eighteenth Annual Joint Conference of the IEEE Computer and Communications Societies. Proceedings, IEEE New York, NY, USA Mar. 21-25, 1999, Piscataway, NJ, USA, IEEE, US, Mar. 21, 1999, pp. 98-106.

* cited by examiner

I,J = LinkID, link-cost
K = cross-conn-cost

METHOD FOR ROUTING IN TELECOMMUNICATIONS NETWORKS

CONTINUING DATA

This application is a 371 of PCT/IBO2/03365, which was filed on Jul. 9, 2002. This application claims foreign priority to Italy M 101A001508, which was filed on Jul. 13, 2001.

The present invention relates to methods for finding optimal paths (routing) quickly and efficiently within telecommunications networks and in particular with SDH or WDM traffic.

The ever wider spreading of telecommunications services and the complexity of the apparatuses making up telecommunications networks bring considerable problems of design and implementation of routing algorithms which would be efficient and give satisfactory performance.

In the architecture of networks all the SDH or WDM apparatuses of the current generation do not play an active role in shortest path calculation and all the data concerning the network is memorized in a single database containing a complete view of the network.

In this centralized architecture the data describing the present status of the network must therefore be loaded from the database when the routing algorithm is to be applied for calculation of the shortest path and data routing. This generates not a few problems, especially if the present size of telecommunications networks is considered and especially their tendency to grow. Indeed, present-day networks are made up of several thousand apparatuses connected by a number of links proportionate to the number of apparatuses and the present rate of growth promises reaching tens of thousands in a short time to then proceed to hundreds of thousands in the not distant future.

It is clear that recovering such a large amount of data every time calculation of a shortest path is required involves a considerable effort and therefore too long response times. Accesses to the data base indeed constitute a set of very costly operations from the time viewpoint. The time employed in accesses proves to be much longer than the time actually spent on calculation. The large memory requirement for loading all the data contained in the database must also be remembered. In addition, restrictions on routing of the network members imply a posteriori verification of results with possible failures and the need to repeat the search algorithm. One proposed solution was to partition the network to secure the advantages of needing less memory (having a smaller graph) and securing a faster routing algorithm. But partitioning alone makes it possible to attack only part of the problems.

The general purpose of the present invention is to remedy the above mentioned shortcomings by making available a method enabling routing in telecommunications networks with greater efficiency, scalable so as not to be affected in an unacceptable manner by the increase in apparatuses and links in the network, and which would allow tracing the optimal path while respecting any connection restrictions of the apparatuses making up the network.

In view of this purpose it was sought to provide in accordance with the present invention a method for routing in telecommunications networks comprising the steps of partitioning the graph G of the network and creating a reduced graph $G^R$ on the partitions $P_i$ in a preprocessing step in which a dual graph of the network is constructed and the graph is reduced using connections restricted by the characteristics of the apparatuses and performing the routing on the graph thus converted.

Figure 2:
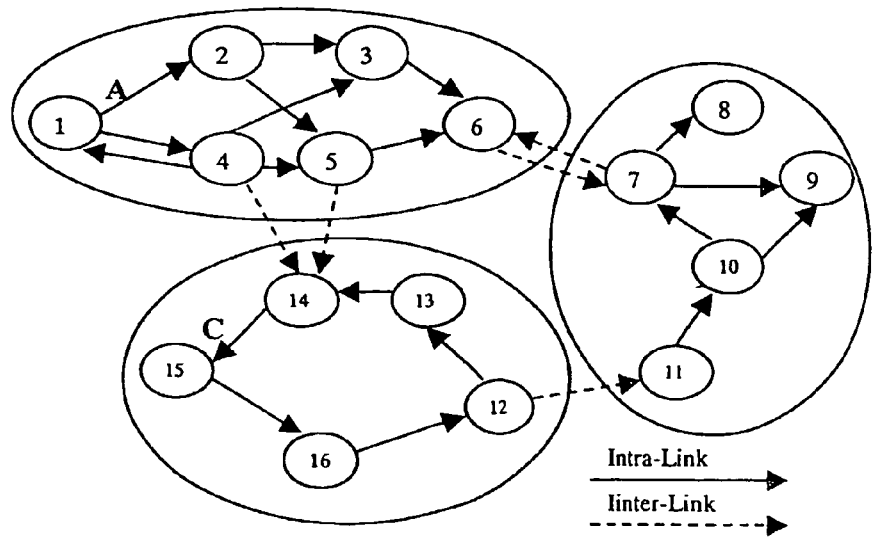
Figure 3:
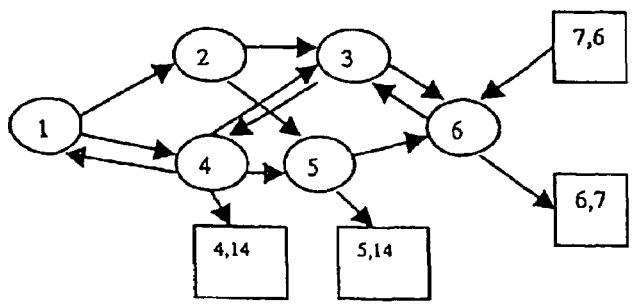
Figure 4:
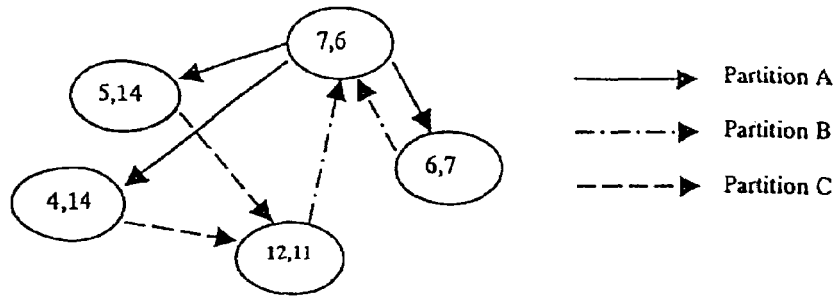
Figure 5:
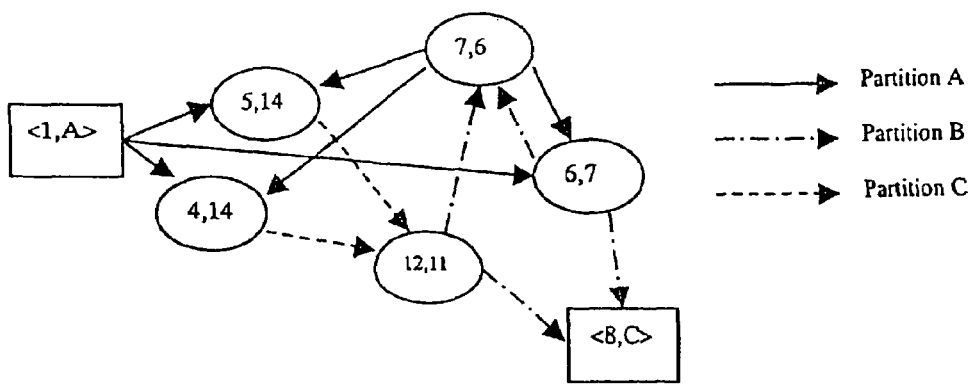
Figure 6:
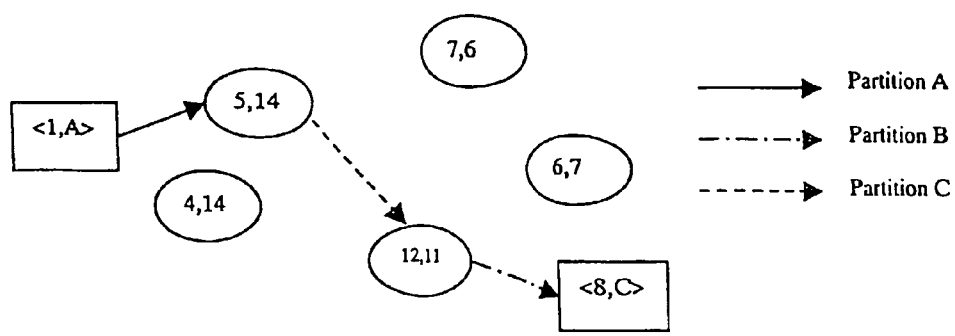
Figure 7:
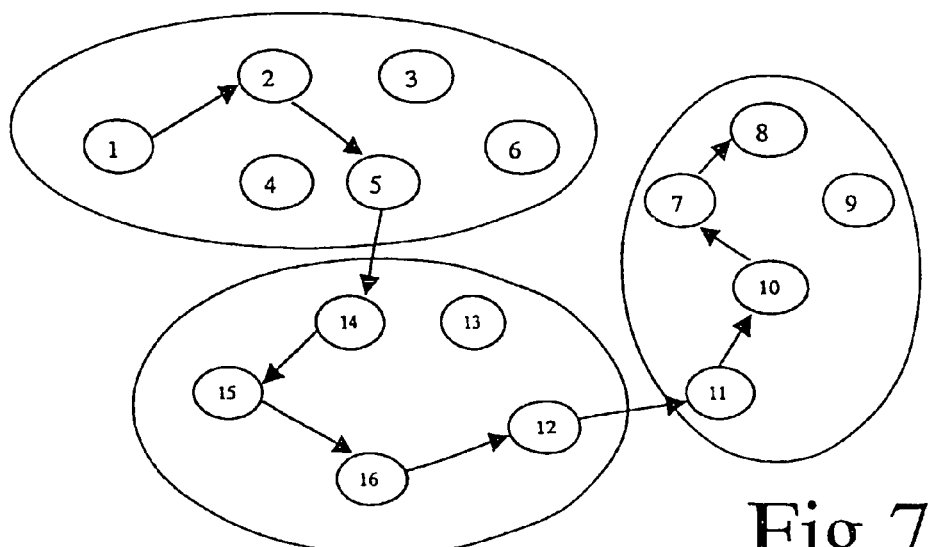
Figure 8:
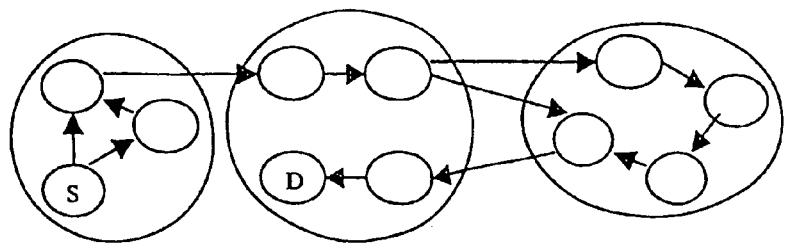
Figure 9:
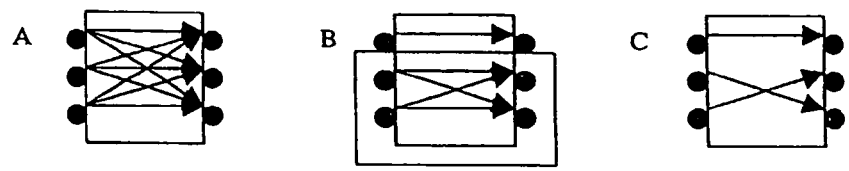

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a graph of an example of a network,

FIG. 2 shows a possible partitioning of the network of FIG. 1 in three subnetworks A, B and C, FIG. 3 shows the addition of fictitious nodes for partition A of FIG. 1, FIG. 4 shows the reduced graph of the original partition A and created by following the method of the present invention, FIG. 5 shows an example of dynamic completion of the reduced graph, FIG. 6 shows an example of the shortest path found on the reduced graph, FIG. 7 shows the shortest path of FIG. 6 transferred onto the original graph, FIG. 8 shows an example of a network graph with an optimal path passing through the same partition several times, FIG. 9 shows a schematic subdivision of apparatuses on the basis of connection restrictions.

Figure 10:
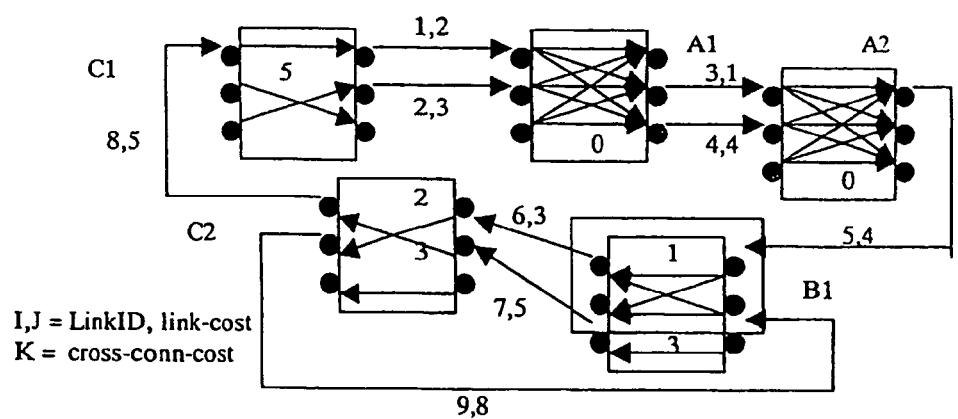
Figure 11:
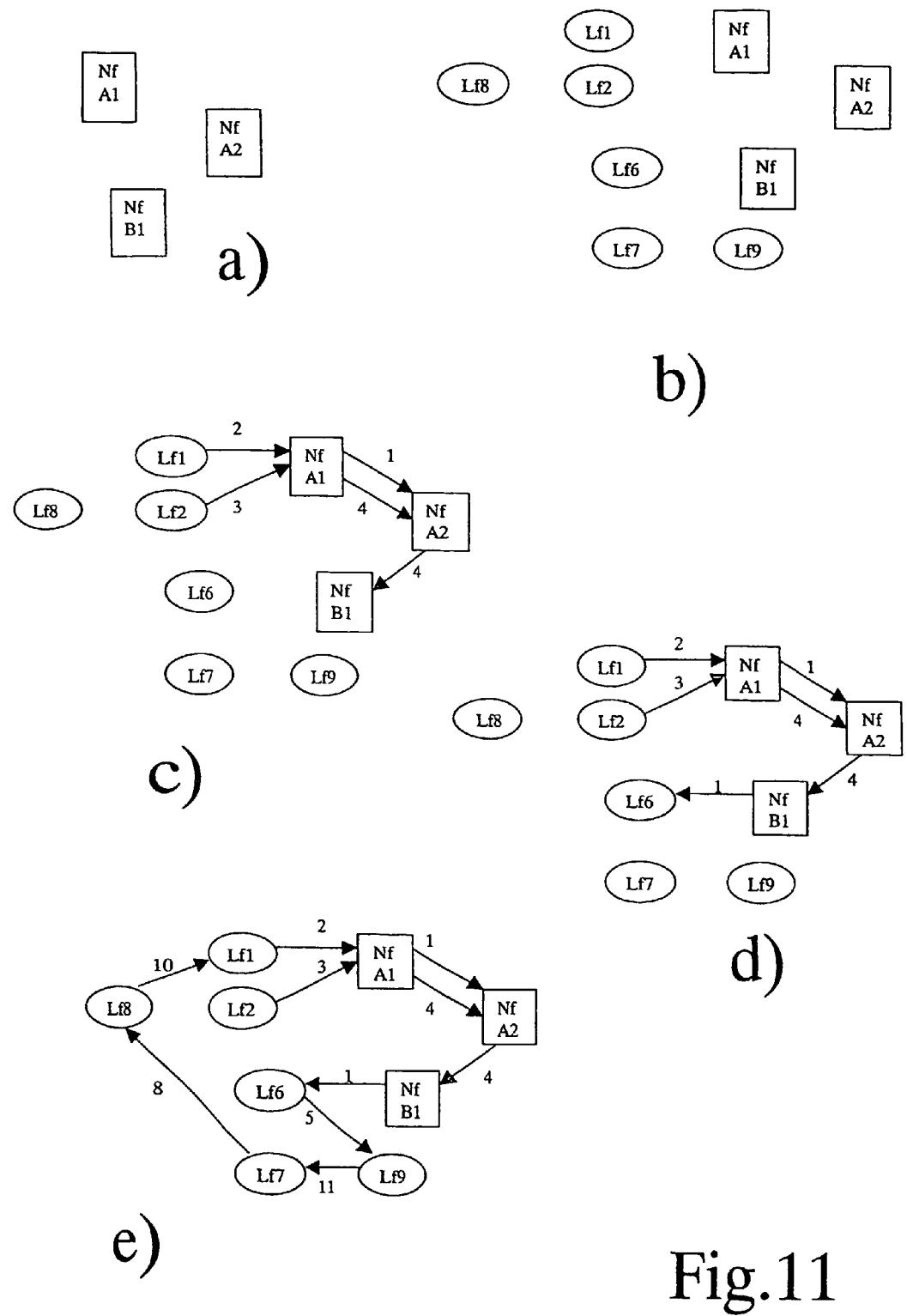
Figure 13:
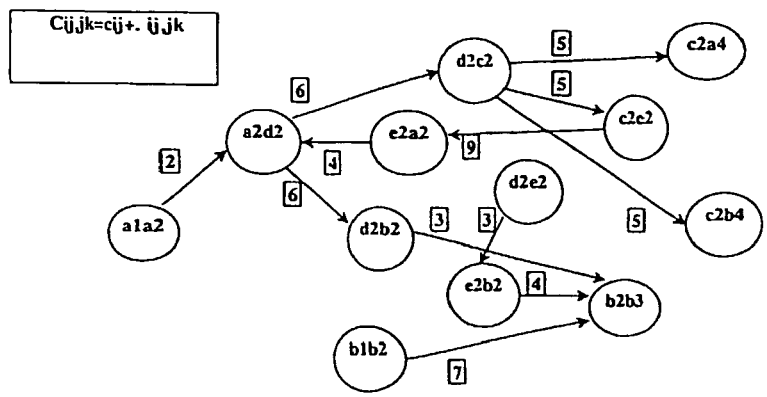
Figure 14:
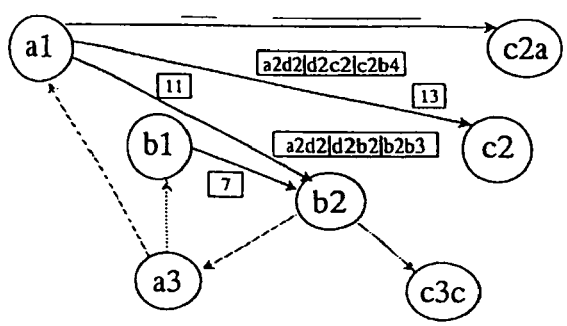
Figure 15:
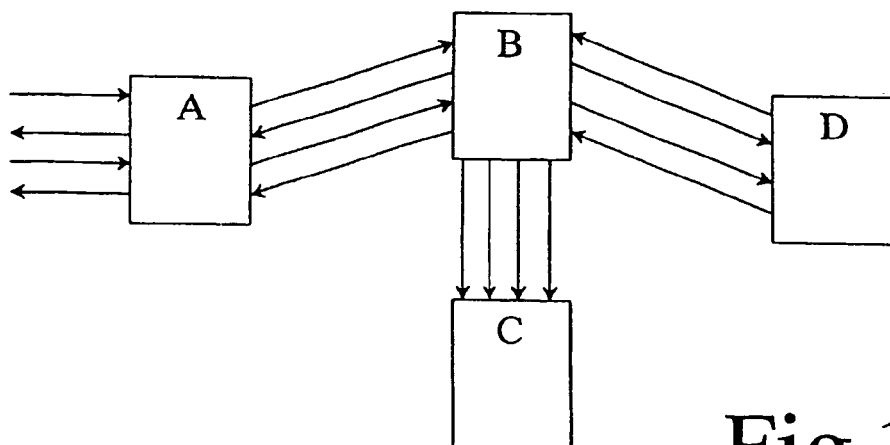
Figure 16:
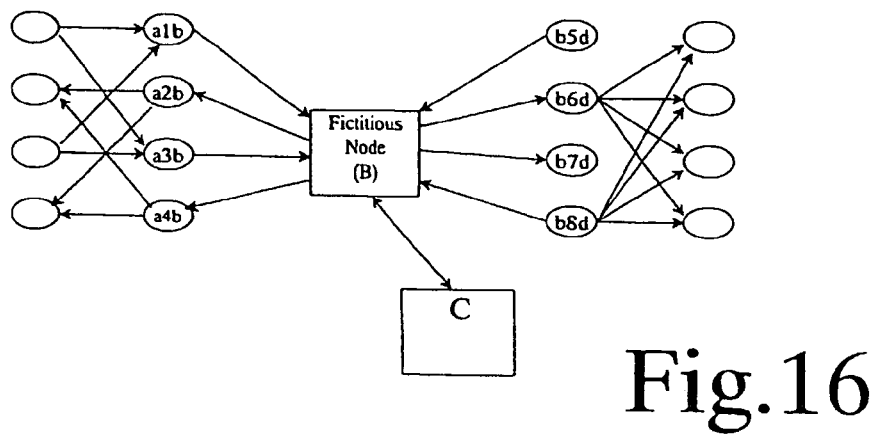
Figure 17:
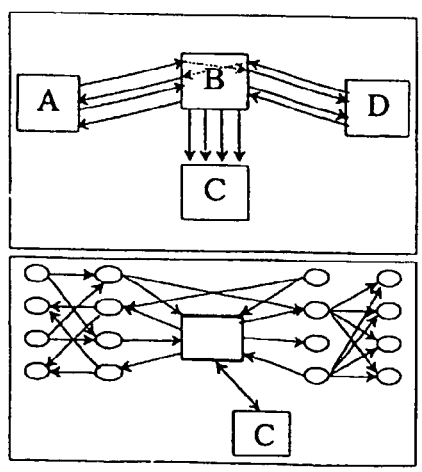

FIG. 10 shows an outline of an original network example to which is applied a 'clever dual network' method in accordance with the present invention, FIGS. 11a to 11e show graphically successive steps of the method applied to the network of FIG. 10, FIGS. 12 to 14 show an example of an application of steps of the method in accordance with the present invention, FIGS. 15 to 17 show another example of an extended application of steps of the method in accordance with the present invention, and FIGS. 18 to 24 show an extended example of an application of the method in accordance with the present invention.

With reference to the figures, FIG. 1 shows a generic example of a network. This network can be first of all partitioned so as to secure a certain number of partitions or subnetworks easier to manage. It is agreed that:

1. Each apparatus of the network belongs to a single partition. One partition contains multiple apparatuses. This implies that the intersection between the set of apparatuses belonging to one partition and the set of those belonging to another partition chosen at random is the empty set.

2. One partition does not contain other partitions. Partitioning of the network thus takes place at a single level of abstraction.

3. The original links of the network are classified as:

Interlink; these links connect two apparatuses belonging to two separate partitions. An interlink is characterized by the pair <source node, source partition> and <destination node, destination partition>.

Intralink; these links connect two apparatuses belonging to the same partition; an intralink is characterized by the triplet of values <source node, destination node, partition>.

4. No link can be classified at the same time interlink and intralink.

5. For both the partitions it connects, each interlink constitutes a port through which traffic can flow. The traffic actually flowing within the port will have a concordant direction with the <source partition, destination partition> arrangement. For this reason the same link fulfills the role of output port for the source partition and input port for the destination port.

To secure partitioning of a network represented by a graph with N nodes (apparatuses), M arches (links) and a cost function C(M), define a set of partitions P and assign to each partition $P_i$, $n_i$ nodes and $m_i$ arches belonging to the original graph in such a manner that for each of these arches the tail and head nodes belong to $P_i$ (intralinks). The remaining $m_k$ arches (i,j) with nodes i and j belonging to two different partitions are the interlinks.

The partitions P are connected through $m_k$ arches (interlinks) of the original graph.

Application of rules (1) and (2) gives:

$$\sum_{i=1}^{P} n_i = N, \left( m_k + \sum_{i=1}^{P} m_i \right) = M$$

FIG. 1 shows an example of a possible network which we shall call original network and FIG. 2 shows a possible partitioning of this network in three subnetworks A, B and C. Of course with the increase in the size of the networks partitioning also generates subnetworks of excessive size as concerns database management. On the other hand partitioning of the network has a limit in the need to avoid excessive fragmentation of the network with resulting excessive number of partitions.

The purpose it is desired to pursue is to memorize an assemblage of basic data which summarize the present status of the network so as to avoid having to memorize a complete copy of the original graph, whether subnetwork or network, and thus avoid having to load all the data describing the network.

In accordance with the present invention, a reduced graph G is therefore extracted from the graph $G^R$ of the original network.

To construct this reduced graph the following steps are taken:

1. Assign to each interlink of the original graph a node $n_f$ in the reduced graph $G^R$.

2. For each partition $P_i$:

Divide the set of ports in the two input and output port sets.

At partition level $P_i$ associate with each of the fictitious nodes $n_f$ created under paragraph 1 representing a port (interlink) of partition $P_i$ a fictitious node which will be a fictitious input node $n_{fi}$ or output node $n_{fu}$ depending on the direction of the associated port.

Connect the fictitious node $n_{fi}$ or $n_{fu}$ with the node which in the original graph is connected to the port in question. To avoid counting the same cost twice, assign cost 0 to the arch which has the node $n_{fu}$ as its head. The cost of the arch having as its tail the node $n_{fi}$ remains unchanged at $c_{in}$.

Calculate the shortest path from each fictitious input node $n_{fi}$ to each fictitious output node $n_{fu}$; each path is characterized by a set of arches of the original graph which connect the <input port, output port> node pair.

3. Arch set calculated in paragraph 2 an arch in the reduced graph $m_r$ connecting the nodes $n_f$ representing the two ports. If the path between the two fictitious nodes does not exist and thus the set of arches associated with said path is the empty set, do not insert the arch in the reduced graph.

4. The following data are associated with each arch $m_r$ of the reduced graph:

the list L of arches of the original graph traversed by the path which in the original graph connects the ports for the fictitious nodes $n_{fi}$ and $n_{fu}$, the cost, which is the sum of the costs of the arches traversed by the path in the original graph, and the name of the partition in which the path was calculated.

$(G^R(P_i))$ is defined as the set of arches of $G^R$ whose list of arches L was calculated within the partition $P_i$. In equivalent manner, $(G^R(P_i))$ represents the set of arches of $G_R$ whose partition field is $P_i$.

FIG. 3 shows the addition of fictitious nodes for partition A of FIG. 1. FIG. 4 shows the reduced graph representing the original partition A created by following the above mentioned steps.

To clarify understanding of the reduced graph construction, the costs of the arches were not inserted in the figures, so as to not complicate the illustration.

It is conjectured for example that the shortest path within partition A from port 7,6 to port 5,14 is {7,6; 6; 3; 4; 5; 5,14}. The data associated with the arch of reduced GR <7,6; 5,14> will thus be:

1. List L: L={<7,6; 6>, <6;3>, <3;4>, <4;5>, <5; 5,14>}.
2. Total cost of this path.
3. The partition name, A.

Again for the sake of clarity the path is designated as a succession of arches in which to each arch has been assigned as the identifier the pair of names of the associated tail and head nodes. Of course this wording does not apply if there is more than one arch connecting the same pair of nodes in the same direction.

Another simplification, again with the purpose of understanding this example, is to designate by different names the nodes belonging to different partitions; in reality an apparatus is distinguished by the 'name, partition' pair of values and it is therefore possible that two apparatuses belonging to two different partitions share the same name.

When a connection request R arrives for a pair of nodes identified by the coordinates <source node $n_s$, source partition $P_s$>, <destination node $n_d$, destination partition $P_d$> it is necessary to complete the reduced graph by taking the following steps:

1. Add to the reduced graph the source and destination nodes of the original graph.

2. For the pair <$n_s$, $P_s$>;

Take from the database all and only the data for the source partition, calculate the shortest paths from the source node to all the output ports of the source partition, associate with each path calculated under the above paragraph an arch containing the same data contained by the other arches of the reduced graph (list of arches traversed on the source partition, total cost, name of the source partition).

3. For the pair <$n_d$, $P_d$>;

take from the database all and only the data for the destination partition, calculate the shortest paths from all the input ports of the destination partition to the destination node, associate with each path calculated under the preceding paragraph an arch containing the same data contained by the other arches of the reduced graph (list of arches traversed in the destination partition, total cost, name of the destination partition).

FIG. 5 shows an example of dynamic completion of the reduced graph applied to the $G^R$ of FIG. 4 necessary for calculation of the path from node 1 of partition A (<1,A>) to node 8 of partition C (<8,C>).

When the reduced graph is complete it is possible to calculate the shortest required path by operating directly on the reduced graph.

So an ordered list of arches $<n_{fi},n_{fu}>$ of the reduced graph $G^R$ is found. With each member of the list, that is with each arch $m^r$ of the reduced graph, is associated the list of arches of the original graph which are traversed by the shortest path between the two ports associated with the fictitious nodes $n_{fi}$ and $n_{fu}$.

The last step, necessary for supplying the required solution, consists of linearizing the list by following the order of the arches of the reduced graph making up the solution and of course avoiding repetition of the interlink arches.

Assume for example that the shortest path from node 1 of partition A <1,A> to node 8 of partition C<8,C> calculated on the reduced graph of FIG. 5 is the one shown in FIG. 6. As may be seen in FIG. 6, this shortest path is made up of the sequence of three arches of the reduced graph, to wit the arch <1,A; 5,14> and the arch <12,11; 8,C> which were added during dynamic completion of the reduced graph and the arch <5,14; 12,11> which was introduced during construction of the reduced graph.

Assume that the following data are associated with the three arches:

1. Arch <1,A; 5,14>:
   L={<1;2>, <2;5>, <5;5,14>}.
   Cost $c_1$=12.
   Partition name: A.
2. Arch <5,14; 12,11>
   L={<5,14;14>, <14;15>, <15;16>, <16;12>, <12;12,11>}
   Cost $c_2$=5
   Partition name: B.
3. Arch <12,11; 8,C>:
   L={<12,11; 11>, <11;10>, <10;7>, <7;8>}
   Cost $c_3$=6
   Partition name: C.

The shortest path from node 1 to node 8 in the original graph thus has a cost equal to the sum of the costs of these three arches, $c_{tot}=c_1+c_2+c_3=23$, and is made up of the following sequence of arches: path ={<1;2>, <2;5>, <5;14>, <14;15>, <15;16>, <16;12>, <12;11>, <11;10>, <10;7>, <7;8>}.

The path found from node 1 to node 8 on the original graph is thus the one shown in FIG. 7.

It should be noted that the routing method proposed ensures that the optimal path is calculated even in the special case where the optimal path passes through the same partition several times as shown by way of example in FIG. 8.

This is very important where the source and destination nodes belong to the same partition. In this case it may be advantageous to load all the data associated with the partition containing the two nodes and attempt first to calculate the shortest path between the two nodes inside the partition without using the reduced graph. The path thus calculated is not necessarily the optimal one which could pass through other partitions and then return within the partition containing the two nodes but it is a valid solution to the problem of creating a connection because in general the number of links making up the path can be limited. If this first attempt fails because the path within the partition does not exist, it does not mean that it does not exist in the original network; for this reason, if the path was not found, it suffices to extend the calculation to the entire reduced graph, proceeding by the method in accordance with the present invention as in the general case.

Again with reference to calculation of the shortest path on the reduced graph, cancellation on the reduced graph of the source and destination nodes and associated incident arches can be performed at any time before calculation of the following connection. On this point it may be advantageous to cancel this data only when a new connection request arrives. This way, if the new source or destination node coincides with the previous source or destination node the previous data can be reused.

It will of course be necessary to update the links which may have become inconsistent after calculation of the previous connection.

This is a general requirement; a solution being supplied, it is necessary to ensure consistency of the reduced graph with the original graph. The reduced graph must at all times summarize the present state of the network.

There are different situations which could generate consistency problems. The main ones can be summarized as the use of resources already allocated, release of a connection, insertion of a new node or link in a partition, cancellation of a node or link in a partition, insertion of an interlink, and cancellation of an interlink.

These main case are examined below.

For example, to avoid a subsequent connection being able to use the resources of the one just calculated, the resources used by the solution found should be assigned; in this manner a subsequent connection request cannot use these resources until they are released. The problem of consistency, which in this case we can define as the 'resource occupation problem', occurs for all the $m^r$ links of the reduced graph $G^R$ belonging to the path found and for all the links of the reduced graph $G_R$ containing in their list L a link G belonging to the solution found. On the contrary, the consistency problem in this case does not occur for all the links of $G^R$ calculated in G partitions not traversed by the connection set up and for all those links of $G^R$ not containing in their lists one of the links belonging to the solution found; the shortest path remains unchanged as regards the case in which the resources had not yet been assigned.

An identical consistency problem with an identical solution is had when a node or link of a partition is cancelled. On the other hand, upon release of a connection there is the situation, dual of the preceding one, which can generate consistency problems because of the resources previously occupied by a connection become available for calculation of new connections. In the presence of such an event therefore it is necessary to update all the paths calculated in the partitions of G which are traversed by the released connection.

Identical consistency problems are had with the insertion of a new node or link in a partition and it is again necessary to update all the paths calculated in the partition where the new node or link is installed.

But when an interlink is inserted, a new node belonging to GR is associated with the new arch of G. Insertion of this new node involves calculation of the paths of all the input ports up to the interlink in question within the partition containing the tail node and calculation from the interlink to all the output ports within the partition containing the head node.

On the contrary, upon cancellation of an interlink the node of GR which represented this port must be cancelled together with all the input and output arches affecting it. As may be seen, some diligence is necessary to keep the reduced graph always consistent. The doubt may arise that the diligence expended to keep the reduced graph consistent annuls the advantage of using it and that better response times are not had than when all data are extracted from the database each time a new connection request arrives.

In reality it has been proven that the time necessary to update the reduced graph can be tranquilly spent after exposure of the path found and therefore in the dead time between two requests. On the client's part, if the routing algorithm uses the reduced graph there is thus the undoubted advantage of receiving an immediate response because the updating time of the reduced graph does not weigh on the client.

The only accesses to the database made in the lapse of time between arrival of the connection request and viewing of the response concern only the two source and destination partitions; it is recalled that these data are necessary for dynamic completion of the reduced graph. It is clear that in this manner the purpose of acceding as little as possible to the database is achieved.

In addition, it was observed experimentally that the number of links making up a connection is very small as compared to network size.

The small number of arches making up a connection allows it to be stated that the probability that the connection will traverse few partitions is very high and this means that having to load a considerable amount of date from the database is unlikely. Only in the reduced graph construction step is access had to the database to take all the data of the network and this preprocessing step once ended no longer affects response time.

At the same time, given a partition $P_i$ traversed by the connection just set up, it is unlikely that all the arches of $(G^R(P_i))$ will have to be calculated again because as the number of arches of the connection belonging to the partition $P_i$ is not high it is unlikely that an arch of $G^R(P_i)$ will contain in its list L one of the arches of the connection. In reality, this last aspect depends strongly on the topology and distribution of costs of the various partitions and in the construction of the reduced graph it may happen that several arches of $G^R(p^i)$ will contain the same link if there are obligatory paths or arches in the $P_i$ especially advantageous in terms of cost.

The possibility of 'paralellizing' the algorithm should not be undervalued. Since the apparatuses managed do not fulfill an active role in calculation of the shortest path and hence it is impossible at the moment to realize a distributed algorithm, the only way to achieve this purpose is to make the best use of the calculators designed for network management. These calculators are multiprocessor machines with shared memory and very powerful.

Use of the reduced graph added to partitioning of the network allows distribution of the workload over various processors on the basis of a geographical distribution of resources and it may be sought to associate a thread with each partition so as to perform the operations of construction and updating of the reduced graph in parallel. In telecommunications networks some SDH or WDM apparatuses distributed in the network introduce connection restrictions which considerably complicate the routing algorithm. A connection restriction implies that it is not always possible, given an established input port, to connect it with just any output port.

The ports of an apparatus can be arranged for example in three possible sets depending on the connection restrictions they have. The following can be distinguished:

ports without restrictions for which a signal reaching the input to the apparatus through one of the ports belonging to this set can leave the apparatus through any output port belonging to this set, ports with total restriction or 'fixed cross connection' ports; a signal reaching the apparatus input through one of the ports belonging to this set is forced to leave the apparatus through a predetermined output port belonging to this set, and ports with partial restriction or protection; these ports are used to protect the connections which were set up using the ports of other sets. The restrictions of this set of ports depend on which connections are to be protected. To these connection restrictions which limit switching operations are added for example those due to the impossibility of connecting an optical signal from a certain channel characterized by a certain wavelength to another channel also characterized by its own wavelength. This problem appears for example in the multiplexing of several signals from the SDH domain to the WDM domain which takes place through the use of appropriate cards and a multiplexer (MUX).

Each of these cards must of course transmit its signal to the multiplexer using a wavelength different from all those with which the other signals input to the MUX coming from other cards are sent. The MUX has the function of multiplexing these different signals in a single WDM signal and transporting them with different wavelengths within the same fiber. The wavelength at which the signal is sent from the card to the MUX is set through hardware. In truth there are different studies aimed at allowing setting of the appropriate ë by software, which would introduce higher degrees of freedom in the routing process.

All these limitations entail solving the shortest path problem with penalties and prohibitions; with each pair of arches (i,j)(j,k) is associated a penalty indicating the cost of switching an input signal at node j from the arch (i,j) to the arch (j,k). If the switching is not allowed the penalty is infinite.

With a dual network at each arch of the original graph is associated a node in a 'converted graph'. An arch is associated with each penalty. A disallowed switching is simply shown as absence of the arch in the converted graph. It was surprisingly found that among the various possible conversions a dual graph conversion or dual graph appears to be the most satisfactory. Just for the dual conversion characteristic, in a telecommunications network where the nodes are much smaller in number than the connections, the conversion into a dual graph should generate an unacceptable increase in complexity. In the dual graph the number of nodes is equal to the number of arches in the original graph and the arches of the converted network represent the admissible cross connections in the network apparatuses. The most obvious problem of the dual graph applied to the world of SDH or WDM telecommunications is that to represent some restrictions introduced by some apparatuses the same conversion must be performed for all the apparatuses. This implies that the conversion must also be performed for all those apparatuses which do not introduce connection restrictions and for which the preparatory physical expansion work of the nodes is therefore too costly; an apparatus which has no connection restrictions is exploded through the dual graph into a number of nodes $Ò=(Ò_{in}+Ò_{out})$ where $Ò_{in}$ represents the number of input links to the apparatus in the original graph and $\dot{O}_{out}$ represents the number of output links from the apparatus of the original graph and into a number of arches equal to $M_r=(\dot{O}_{in}\times\dot{O}_{out})$.

It is seen below that the use of dual conversion and reduced graph and partitions of the present invention gives rise to what can be called 'clever dual graph' conversion which cancels the disadvantages of the dual graph and, on the contrary, allows achievement of high routing efficiency.

This method uses dual conversion to construct graphs associated with the various partitions; once the paths necessary for construction or updating the reduced graph are calculated, said graphs are cancelled.

It is thus achieved once again that the the only data structure kept permanently and updated regularly is the reduced graph. Calculation of the paths from the input ports to the output ports of each partition ensures that the connection restrictions of the apparatuses are respected. The connection established by operating directly on the reduced graph GR thus respects the restrictions because it is the linking together of various paths which are all admissible.

On the reduced graph therefore it is not necessary to perform any conversion but the above described is used directly for seeking the shortest path in the unrestricted case.

By using partitioning of the network, growth of the number of nodes and arches is limited to the partitions involved each time in updating of the network. To underscore this fact, suffice it to think what it means to load from the database all the data concerning the network and operate the conversion on such a large amount of data each time a connection request arrives.

Assume a network G(V,A) where |V|=N and |A|=M and designate by W the average number of input links to each apparatus. Since an input link to an apparatus is an output link from another apparatus, W also represents the average number of output links from each apparatus.

To avoid possible misunderstandings it is observed that W was defined herefrom as the average number of input or output links to or from each apparatus which are actually installed in the network. It is wrong to confuse this number with that of the links which the apparatus can manage at input or output; these two values coincide only in the worst case, from the viewpoint of size of the converted network, in which each apparatus has at input or output the maximum number of installable links.

In the worst case, in which all possible cross-connections are admitted, the dual graph conversion generates a network consisting of M nodes and $N\times W^2$ arches since each arch becomes a node and for each apparatus there are $W^2$ arches. Each input link can be connected to each output link and the average number of input and output links is W.

From the foregoing it is clear that to construct and update the reduced graph it is necessary to perform the shortest path search algorithm several times. The choice of which shortest path algorithm to use is therefore one of the critical points.

A choice based on efficiency can advise the use of the Dijkstra algorithm implemented with the particular data structure of the Fibonacci Heap. In this implementation of the Dijkstra algorithm the computational complexity on a network with N nodes and M arches is equal to $O(M+N\times\log(N))$, substituting for M the value $N\times W2$ and for N the value M it is found that the complexity of the converted network is:

$$O(N\times W^2 + M\times\log(M))$$

It is observed that the value W is limited above by the maximum number of links manageable by the apparatus and accordingly the previous complexity becomes:

$$O(N+M\times\log(M))$$

In practice however the value of W is important especially in networks made up of few nodes and arches.

At this point the following consideration becomes necessary. SDH traffic is structured traffic and consequently each connection request must specify the type of traffic desired in addition to the pair of source and destination nodes; this implies that a reduced $G^R$ for each type of traffic is kept in the memory.

In theory, at the level of creation of the graph representing the network (regardless of the use of the reduced graph) this situation would involve an expansion of each link into a number of arches equal to the number of containers available on that link in relation to the type of traffic requested. The basic observation is that the connection restriction concerns the pair of input or output links and not a particular container chosen within the two links. In this manner, in the data taking step, it is possible to choose any one of the containers available for support of the type of traffic requested. To ensure correct traffic distribution the cost of the arches is established on the basis of a linear combination of the cost assigned by the client to that link and the availability of traffic on that link.

The same reasoning applied for SDH traffic is valid for WDM traffic where the optical apparatus is able to make a complete wavelength conversion. Even in this case, indeed, it is possible to choose any one of the channels available on the optical link instead of exploding the link into the number of channels available and assign a cost in accordance with the criterion proposed for SDH traffic. Besides, other wavelength assignment policies can be applied.

Clearly the apparatus input and output links to and from the apparatus can be exploded so as to assign costs which favor cross connections which do not make wavelength conversion if this operation takes place without conversion of the optical domain signal into the electronic one and vice versa (OEO conversion).

For WDM single-hop networks on the other hand it is necessary to explode each link into a number of links equal to the number of channels available.

Single-hop networks, indeed, introduce the 'wavelength continuous restriction' in which the connection which is to be established will use the same wavelength in each of its links. To obtain an admissible solution it is necessary to insert into the converted network only the arches representing a cross connection between two identical wavelengths. From the viewpoint of the restriction introduced we can compare the wavelength continuous restriction with the fixed cross-connections.

We wrote above about the apparent increase in complexity which the use of a dual graph should introduce. In reality, with partitioning in accordance with the present invention it is possible to divide the apparatus into sets which have as a characteristic the fact that they possess connection restrictions and sets which do not have connection restrictions. In this manner there are apparatuses without connection restrictions in the partitions and the dual graph is not used but the preferred 'single shortest path algorithm' is applied directly. If in the same partition there are both types of apparatus, with and without restrictions, the following procedure termed 'clever dual network' may be applied. In other words the dual network is not efficient for network members without restrictions. In this case a variation is possible on the method or algorithm (clever dual network) which uses the fact that these nodes are characterized by each input being able to reach an output without any penalty. Each arch is therefore with zero penalty. In this manner the arch from p^2 to 2p is possible.

It consists of the following steps.

1. Divide the apparatuses in the following three classes (an example of apparatuses in the three classes is given in FIG. 9):

A apparatuses without connection restrictions; any input port can be connected to any output port, B apparatuses with partial connection restrictions; there is at least one set made up of input and output ports within which it is possible to connect any input port with any output port, and C apparatuses with total connection restrictions; each input port has restrictions to be respected.

2. Associate with each type A and B apparatus a fictitious node Nf in the converted graph.

3. Associate with each link having as tail or head a port with connection restrictions a fictitious node Lf in the converted graph; this takes place if one of the two nodes of the original graph is type C or B and the port used has restrictions.

4. For each fictitious node Nf of the converted graph associated with an original type A node;

for each fictitious node Lf created under paragraph 3 and concerning it insert a link connecting Lf to Nf if the original arch for Lf was input to the original node for Nf; the cost of this arch must be that of the original arch represented by Lf;

for each fictitious Lf node created under paragraph 3 and concerning it insert a costless link connecting Nf to Lf if the original arch for Lf was output for the original node associated with Nf; and consider the arches of the original graph not having undergone the conversion described in paragraph 3 and which have in the original graph the node for Nf as head or tail; for each arch connect Nf to the other fictitious node associated with the tail or head node of the original graph while keeping the same cost of the arch of the original graph.

5. For each fictitious node Nf of the converted graph associated with an original type B node;

consider all the fictitious $Lf_{in}$ or $Lf_{out}$ nodes created under paragraph 3 for input or output arches of the original graph in a port with restrictions to or from the node for the fictitious node Nf and for each of these fictitious nodes $Lf_{in}$ insert a link connecting $Lf_{in}$ to the other fictitious $Lf_{out}$ nodes; this connection must be made only for the pairs of fictitious nodes $Lf_{in}$, $Lf_{out}$ corresponding to pairs of arches of the original graph which are connectable; the cost of the arch must be equal to the sum of the cost of the original arch represented by $Lf_{in}$ and the cost of the penalty to be paid for connecting the two arches in the original graph;

consider all the fictitious nodes $Lf_{in}$, $Lf_{out}$ created under paragraph 3 for input or output arches of the original graph in a port without restrictions to or from the node for the fictitious node Nf and insert for each of these fictitious nodes $Lf_{in}$ a link connecting the fictitious node $Lf_{in}$ to the fictitious node Nf while keeping the cost of the original arch represented by $Lf_{in}$, and for each of these fictitious nodes $Lf_{out}$ insert a link connecting the fictitious node Nf to the fictitious node $Lf_{out}$ at zero cost;

consider the arches of the original graph which have not undergone the conversion described under paragraph 3 and which in the original graph have the node represented by Nf as head or tail; for each arch connect Nf to the other fictitious node associated with the tail or head node of the original graph while keeping the same cost of the original graph arch.

6. For each fictitious node Nf of the converted graph associated with an original type C node;

all the fictitious nodes $Lf_{in}$ or $Lf_{out}$ created under paragraph 3 are associated with input or output arches of the original graph in a port with restrictions to or from the node represented by Nf; insert an arch for all the $Lf_{in}$ or $Lf_{out}$ pairs which represent two arches connectable in the original graph.

FIG. 10 shows by way of example an original network to which the steps of the above described method are applied. In particular the figures, from 11a to 11e show steps 2, 3, 4, 5 and 6 of the conversion respectively.

We described above how partitioning of the network in accordance with the present invention allows limiting the size of the dual graph; network conversion is applied individually to each partition to allow construction operations, dynamic completion and updating of the reduced graph.

By so doing, each partition has a smaller number of nodes and links than the whole network. After each of these operations the data structures representing the dual graph of the partitions involved are cancelled.

These remarks do not change if clever dual network is considered in place of the dual graph.

But the clever dual network of the source and destination partitions involved in dynamic completion of the reduced graph must also be constructed when a connection request arrives. In addition, it must be possible to identify the nodes of the request in the converted network.

Starting from the above observations the following further steps can be formulated for dynamic completion of the reduced graph.

1. During the construction operations of the clever dual network for the source or destination partition, if the source or destination node is type C a fictitious node is added; if the source node is type A or B the node of the converted network is created directly during the normal operations necessary for construction of the clever dual network.

2. Consider the source node $n_s$ and if $n_s$ is type A no action is taken; if $n_s$ is type B add for each output port with connection restrictions an arch between the fictitious node representing $n_s$ in the converted graph and the fictitious node representing the link on that port; if $n_s$ is type C add for each output port an arch between the fictitious node representing $n_s$ in the converted graph and the fictitious node representing the link on that port.

3. Consider the destination node $n_d$ and if $n_d$ is type A no action is taken; if $n_d$ is type B add for each input port with connection restrictions an arch between the fictitious node representing the link on that port and the fictitious node representing the $n_d$ in the converted graph; if $n_d$ is type C add for each output port an arch between the fictitious node representing the link on that port and the fictitious node representing $n_d$ in the converted graph.

In other words, to sum up, the method proposed therefore consists of three steps, to wit:

preprocessing, routing on the converted graph, and updating the graph.

The preprocessing consists of two steps, to wit:

construction of the dual network, and reduction of the graph using the fixed connections; realizing this operation may be an option.

Each time a routing for a type of traffic not yet considered is requested, a reduced graph for that traffic is constructed, canceling the arch of the original graph which does not support that traffic.

For each type of traffic the reduced graph developed by applying the partitioning of the graph described above is kept in memory.

Routing on the converted graph is done in such a way that for each request from node s in partition A to node d in partition B, type of traffic tr, the part of the graph associated with traffic tr and partitions A and B is relplaced by two subgraphs giving least cost from node s to the nodes on the edge of partition A and least cost from the nodes on the edge of partition B to node d.

To this final graph is applied a shortest path search algorithm and, the path being found, the associated resources are reserved.

Updating of the graph is necessary before the next routing but is applied only to the partitions used by the routing. In particular it is necessary to update only the paths of the converted graph which in the original graph share at least one arch with the calculated routing.

This updating is necessary even when a node is inserted, changed or canceled.

Figure 12:
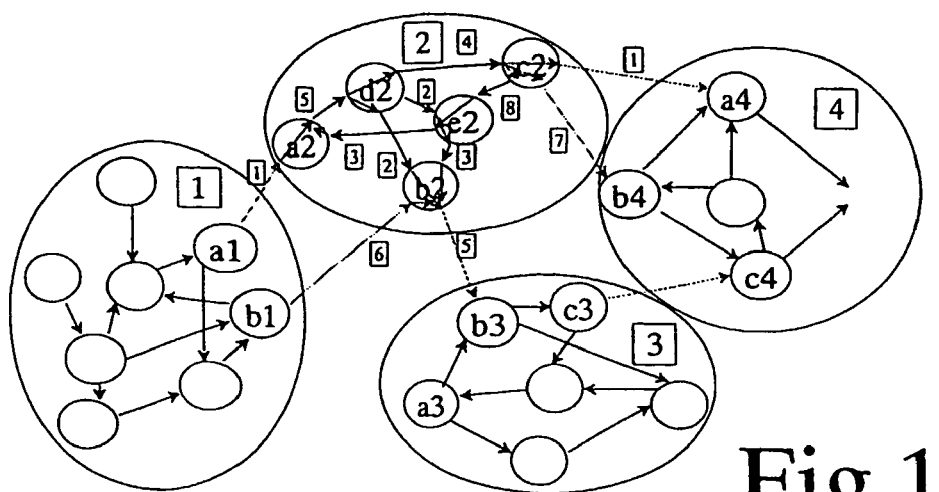

FIG. 12 shows an example of a network. FIG. 13 shows the dual network for subnetwork 2 of FIG. 12. In this example all the penalties are equal to 1: $\delta ij,jk=1$ for each ij,jk. The corresponding reduced graph is shown in FIG. 14. It is seen that if Min(p) and Mout(p) designate the number of I/O arches from and to a partition, in the converted graph there are no more that Min(p)×Mout(p) arches for each partition p.

FIG. 15 shows an example of some apparatuses making up the network and having connection limitations. For example, the limitations are as follows:

The members of networks A and D have complete connection restrictions, the member of network B has partial restrictions on the connection, and the member of network C has no connection restriction.

To convert the network, three different rules are applied depending on the characteristics of the network members. The first two rules are as follows:

full restriction on connection; all I/O connections become nodes;

no restriction on connection; all connections connecting the network member with the network members with connection restriction become nodes; all connections connecting the network member with network members without connection restrictions become a single connection connecting the node without restrictions to a new fictitious node related to the network member without connection restrictions.

Applying these first two rules to the original network of FIG. 15 we obtain the graph of FIG. 16.

The third rule concerns the case of partial connection restrictions; a set of completely connectable ports are represented by a single node; ports with connection restrictions are treated in accordance with the rules of full connection restrictions.

Applying this rule also, the final network is the one shown in outline in FIG. 17.

To summarize what is written above, a summarizing example setting forth the operations necessary for identification of a shortest path in a network with apparatuses which introduce connection restrictions is shown below.

Figure 18:
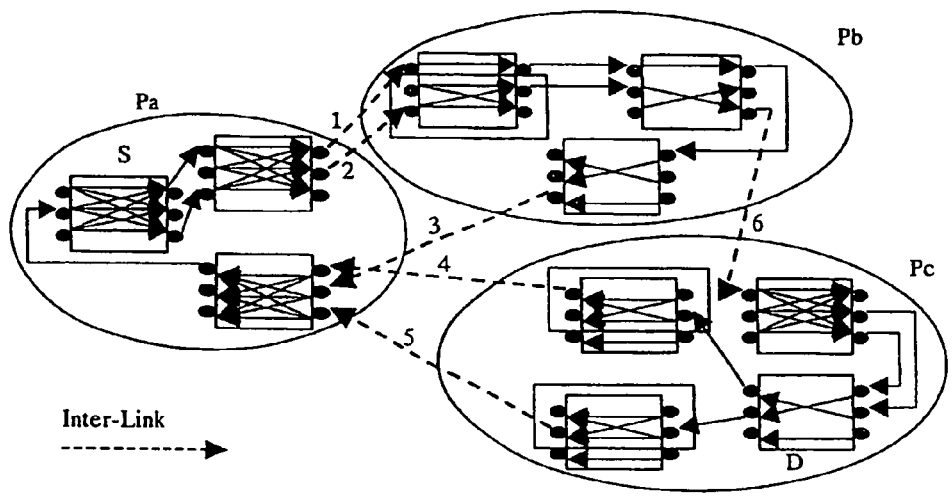

In accordance with the method of the present invention the first step consists of partitioning the original network at one level and classifying the various apparatuses inside the partitions according to the connection restrictions they display. This first step is shown in FIG. 18.

Figure 19:
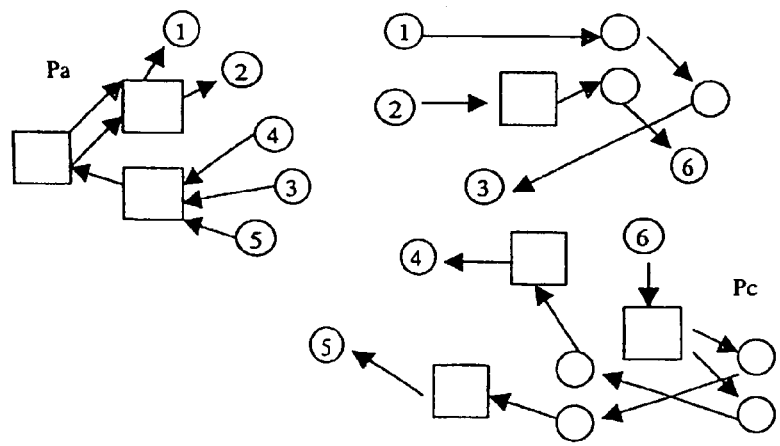

Subsequently, for each partition, it is necessary to insert the fictitious nodes representing the interlinks of the original graph and perform the clever dual network conversion following the operations described above. This step is shown in FIG. 19.

Figure 20:
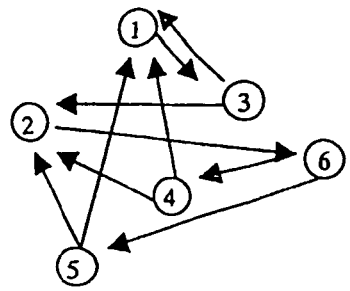

For each partition the shortest paths connecting the <input port & output port> pairs are calculated. If for a pair of such ports there is no path, no arch is inserted in the reduced graph. Proceeding as explained above, the reduced graph GR is constructed. The reduced graph associated with the network of FIG. 18 is shown in FIG. 20.

Figure 21:
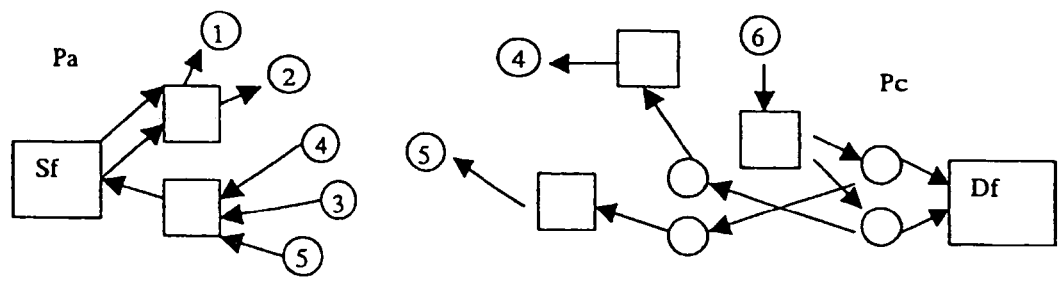

When a connection request (<S,Pa>, <D,Pc>) arrives it is necessary to complete dynamically the reduced graph as explained above while allowing for the clever dual network conversion. This step is shown in FIG. 21 where the clever dual network of the partitions involved in the dynamic completion of the reduced graph is seen while the final result of the completed reduced graph for calculation of the (<S,Pa>, <D,Pc>) connection is shown in FIG. 22.

It is emphasized that as concerns node S belonging to the type A node category no node was added because the fictitious node Sf is created automatically during construction of the clever dual network of Pa. For node D belonging to the type C node category it is necessary to insert a fictitious node Df which, being a destination node, represents the head node of all the arches connecting it to the nodes representing the links appearing on the input ports of D.

Figure 22:
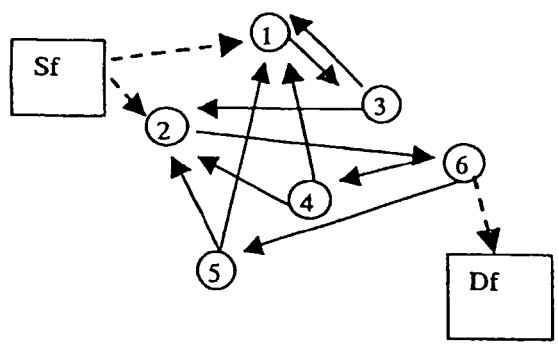
Figure 23:
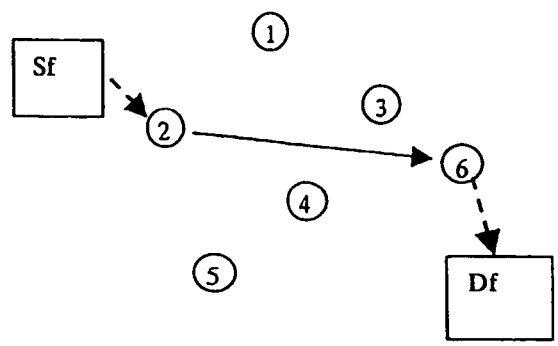
Figure 24:
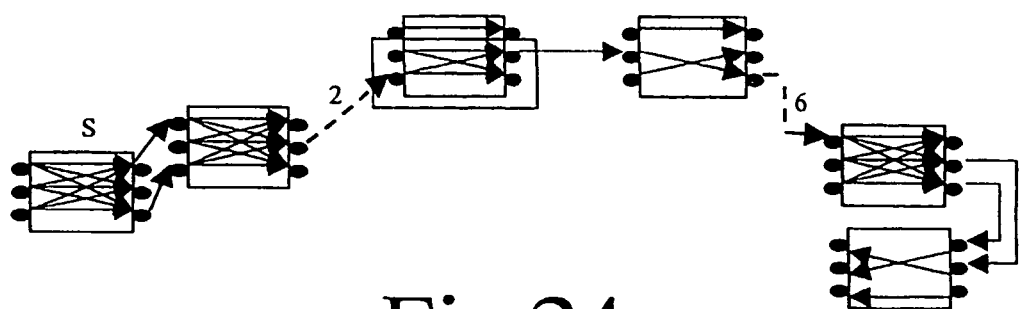

Lastly, the required path is calculated on the reduced graph of FIG. 22 to find the result shown in FIG. 23 to which corresponds the path represented in FIG. 24 in the original graph.

It is now clear that the predetermined purposes have been achieved.

Among the various advantages of the method of the present invention the dual conversion allows subsequent and simpler development of the protection techniques of the network which are basic because of the enormous band supplied by optical fiber communications. On the converted network generated by the dual conversion, shortest path algorithms used in the normal circuit switching networks among which, for example is the algorithm of Dijkstra, can still be used. In addition, the size of the converted network decreases with the increase in the number of connection restrictions in the apparatuses. The fixed cross connection for example considerably reduces the number of arches in the dual network. Lastly, the work of conversion of the original network in the dual network is considerably limited due to the use of network partitioning. Once the reduced graph $G^R$ is constructed, indeed, this work is done only on the source and destination partitions to supply the response to the connection request and on the partitions traversed by the path in the subsequent updating phase which does not burden the client.

Naturally the above description of an embodiment applying the innovative principles of the present invention is given by way of non-limiting example of said principles within the scope of the exclusive right claimed here.

What is claimed is:

1. A method of routing in a telecommunications network, comprising the steps of: partitioning a main graph of the network into partitions; creating a reduced graph of the partitions by constructing a dual graph of the network, and by reducing the main graph using connections restricted by characteristics of apparatuses on the network; and performing the routing on the reduced graph; wherein the reduced graph is created by:
a) assigning each port of the main graph of fictitious node in the reduced graph;
b) for each partition, dividing a set of ports of the network into input and output ports, and associating each fictitious node of an assigned port as a fictitious input node or a fictitious output node depending on a direction of the assigned port;
c) connecting the fictitious input node or the fictitious output node to a network node in the main graph;
d) assigning a zero cost to a bridge which has the fictitious output node at its upstream end;
e) maintaining a cost of the bridge having the fictitious input node at its downstream end unvaried at a predetermined value to avoid counting the cost more than once;
f) calculating paths from each fictitious input node to each fictitious output node, each path being characterized by a set of bridges of the main graph which connect a pair of input and output ports; and
g) associating with each path characterized by a set of not empty bridges, a bridge in the reduced graph that connects the fictitious nodes representing the pair of input and output ports; if a path between two fictitious nodes does not exist and thus the set of bridges associated with this path is an empty set, then the bridge is not inserted in the reduced graph.

2. The method in accordance with claim 1, and storing only the reduced graph in memory.

3. The method in accordance with claim 1, and associating the following data with each bridge of the reduced graph:
a list of bridges of the main graph traversed by the path which in the main graph connects the ports associated with the fictitious input and output nodes,
a cost equal to a sum of the costs of the bridges traversed by the path in the main graph, and
a name of the partition in which the path was calculated.

4. A method of routing in a telecommunications network, comprising the steps of: partitioning a main graph of the network into partitions; creating a reduced graph of the partitions by constructing a dual graph of the network, and by reducing the main graph using connections restricted by characteristics of apparatuses on the network; and performing the routing on the reduced graph; wherein, upon arrival of a connection request for a pair of source and destination nodes identified by coordinates including source and node partitions, the reduced graph is created by:
a) adding the source and destination nodes of the main graph to the reduced graph;
b) for the source node and the source partition, retrieving data for the source partition from a database, calculating paths from the source node to all output ports of the source partition, and associating with each calculated path a bridge containing the same data contained in other bridges of the reduced graph; and
c) for the destination node and the destination partition, retrieving data for the destination partition from the database, calculating paths from all the input ports of the destination partition to the destination node, and associating with each of the calculated paths a bridge containing the same data contained in other bridges of the reduced graph.

5. A method of routing in a telecommunications network, comprising the steps of: partitioning a main graph of the network into partitions; creating a reduced graph of the partitions by constructing a dual graph of the network, and by reducing the main graph using connections restricted by characteristics of apparatuses on the network; and performing the routing on the reduced graph, wherein the reduced graph is created by dividing the apparatuses of the network among:
a) type A apparatuses without connection restrictions in which any input port is connected to any output port of the network;
b) type B apparatuses with partial connection restrictions in which at least one set of input and output ports is connected between any input port and any output port; and
c) type C apparatuses with total connection restrictions in which each input port has restrictions to be respected.

6. The method in accordance with claim 5, and associating with each type A and type B apparatus a fictitious node in the reduced graph, and associating the fictitious node in the reduced graph with each link having an upstream or a downstream port with connection restrictions.

7. The method in accordance with claim 6, in which, for each fictitious node of the reduced graph for the type A apparatus, the steps of:
inserting a link connecting the fictitious nodes if an original bridge for one of the fictitious nodes was input to an original node for another fictitious node, the original bridge having a cost equal to a cost for the original bridge represented by the other fictitious node;
inserting a costless link connecting the fictitious nodes if the original bridge for one of the fictitious nodes was output for the original node for the other fictitious node; and
connecting the one fictitious node to the other fictitious node while keeping a same cost as for the bridge of the main graph.

8. The method in accordance with claim 6, in which, for each fictitious node of the reduced graph for the type B apparatus, the steps of:
inserting a link connecting a fictitious input node to a fictitious node only for pairs of fictitious input and output nodes corresponding to pairs of bridges of the main graph which are connectable;
inserting a link connecting the fictitious input node to the fictitious node while maintaining the cost of the original bridge represented by the fictitious input node, and inserting a link connecting the fictitious node to the fictitious output node at zero cost; and
connecting the fictitious node to the fictitious output node associated with an upstream or downstream node of the main graph while maintaining the same cost as the bridge of the main graph.

9. The method in accordance with claim 6, in which, for each fictitious node of the reduced graph for the type C apparatus, the step of:
inserting a bridge for all pairs of fictitious input and output nodes representing two bridges which are connectable in the main graph.

10. The method in accordance with claim 5, in which the reduced graph is created by:
if a source or a destination node is the type C apparatus, then adding a fictitious node; and if the source node is the type A or type B apparatus, then directly creating the node.

11. The method in accordance with claim 5, in which the reduced graph is created by:
- if the source node is the type A apparatus, then taking no action;
- if the source node is the type B apparatus, then adding for each output port with connection restrictions, a bridge between the fictitious node representing the source node in the reduced graph and the fictitious node representing a link located on that port; and
- if the source node is the type C apparatus, then adding for each output port, a bridge between the fictitious node representing the source node in the reduced graph and the fictitious node representing a link located on that port.

12. The method in accordance with claim 5, in which the reduced graph is created by:
- if the destination node is the type A apparatus, then taking no action;
- if the destination node is the type B apparatus, then adding for each input port with connection restrictions, a bridge between the fictitious node representing a link located on that port and the fictitious node representing the destination node in the reduced graph; and
- if the destination node is the type C apparatus, then adding for each output port, a bridge between the fictitious node representing a link located on that port and the fictitious node representing the destination node in the reduced graph.

* * * * *